US00RE37310E

(19) United States
(12) Reissued Patent
Shemitz

(10) Patent Number: US RE37,310 E
(45) **Date of Reissued Patent: *Aug. 7, 2001**

(54) COMPACT FLUORESCENT LUMINAIRE

(75) Inventor: Sylvan R. Shemitz, Woodbridge, CT (US)

(73) Assignee: Sylvan R. Shemitz Designs, Inc., West Haven, CT (US)

( * ) Notice: This patent is subject to a terminal disclaimer.

(21) Appl. No.: 09/149,928

(22) Filed: Sep. 9, 1998

Related U.S. Patent Documents

Reissue of:
(64) Patent No.: 5,555,162
Issued: Sep. 10, 1996
Appl. No.: 08/349,987
Filed: Dec. 6, 1994

(51) Int. Cl.[7] ..... F21S 3/00
(52) U.S. Cl. ..... 362/225; 362/260; 362/347
(58) Field of Search ..... 362/147, 217, 362/225, 260, 347

(56) References Cited

U.S. PATENT DOCUMENTS

| | | | |
|---|---|---|---|
| 2,240,179 | 4/1941 | Doane | 362/225 |
| 3,363,093 | 1/1968 | Schmitt | 362/347 |
| 4,704,664 | 11/1987 | McNair | 362/225 |
| 4,947,297 | 8/1990 | Druffel et al. | 362/147 |
| 5,089,943 | 2/1992 | Wölfelschneider | 362/216 |
| 5,434,762 | 7/1995 | Shemitz | 362/225 |

FOREIGN PATENT DOCUMENTS

| | | |
|---|---|---|
| 854172 | 9/1977 | (BE) . |
| 34 20 645 | 12/1985 | (DE) . |
| 42 02 754 | 3/1993 | (DE) . |
| 7-21809 | 1/1995 | (JP) . |
| WO92/13231 | 8/1992 | (WO) . |

OTHER PUBLICATIONS

"Options Series" data sheet, SPI Lighting Inc., 1993.
*International Lighting Review*, 1994/2 (2nd Quarter 1994), pp. 60–62.
"Lightfair 1994—New Products," Elliptipar, Inc., May 1994.

*Primary Examiner*—Laura K. Tso
(74) *Attorney, Agent, or Firm*—Fish & Neave; Jeffrey H. Ingerman; Garry J. Tuma

(57) ABSTRACT

An arrangement for two side-by-side elongated lamps in a lighting fixture in which lampholders are alternately mounted on opposite sideplates or brackets of the lighting fixture. The lighting fixture has an inside dimension that is longer than the length of each lamp/lampholder combination by a length sufficient to prevent the distal end of each lamp from overlapping the exposed plug portion and the lampholder of any of the adjacent lamps. The lamps are tightly gathered, and are close enough together to simulate a hairline light source having an optical centerline coincident with the optical centerline of the fixture.

23 Claims, 2 Drawing Sheets

COMPACT FLUORESCENT LUMINAIRE

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part of, commonly-assigned United States patent application Ser. No. 08/233,374, filed Apr. 26, 1994, now U.S. Pat. No. 5,434,762.

Background of the Invention

This invention relates to lighting fixtures. More particularly, this invention relates to lighting fixtures utilizing two elongated lamps to produce increased lamp light output density.

One goal of the lighting industry has been to provide luminaires—lighting fixtures with lamps—with ever higher lamp light output densities. Light output density is generally measured in lumens/foot (L/F), a lumen being a unit of luminous flux. For example, a two-foot-long (approximately 0.61-meter—long) lamp that produces 1000 lumens achieves 500 L/F (approximately 1,639 L/Meter).

One manner of providing a higher lamp light output density has been to use high output lamps, which achieve a greater luminous flux (measured in lumens) from the same size lamp. For example, while a typical four-foot-long (approximately 1.22-meter-long), 32 -watt, T8-size, rapid start lamp will produce a luminous flux of 2,950 lumens, for 737 L/F (approximately 2,418 L/M), a typical four-foot-long (approximately 1.22-meter-long), 60-watt, T12-size High Output rapid start lamp will produce a luminous flux of 4,350 lumens, for 1,087 L/F (approximately 3,566 L/M), an increase of approximately 50% in light output density.

Another manner of achieving greater light output density from a given luminaire has been through use of compact fluorescent lamps (CFL), such as twin-tube lamps, which produce a greater number of lumens, at approximately the same wattage, than are produced by larger conventional lamps. For example, while a typical four-foot-long (approximately 1.22-meter-long), 32-watt T8-size, rapid start lamp will produce a luminous flux of 2,950 lumens, for 737 L/F (approximately 2,418 L/M), a typical 16.5"-long (approximately 42-centimeter-long), 39 watt, T5-size rapid start CFL sold by General Electric Co. under the name Biax® produces a luminous flux of 2,850 lumens, for 2,073 L/F (approximately 6,800 L/M), an increase of approximately 180% in light output density. Similar lamps are sold by Philips, North America under the trademark PL-L® and by Osram under the trademark Dulux L®.

A higher light output density value for a lighting fixture can be achieved by providing an array of lamps in as small a cross-sectional area as possible. However, attempts to utilize this manner of achieving a greater light output density are inherently constrained by the dimensions of lampholders. For example, the width of a standard 4-pin plug-in compact fluorescent lampholder, which is greater than the width of the lamp it is designed to hold, prevents the light-emitting tubes of the CFL lamps from being placed as close together as desired to produce the greatest lamp light output density, as when two of the lamps are placed essentially side-by-side.

The placement of two lamps side-by-side is desirable for several reasons. First, as suggested above, placement of multiple lamps side-by-side increases the numerator in the L/F calculation, serving to increase the overall value of light output density of a luminaire. For example, two 16.5"-long, 39 watt, twin-tube CFL lamps, placed side-by-side, would produce 5,700 lumens, for 4,145 L/F (approximately 13,540 L/M), an increase of approximately 100% in light output density, as compared to one 16.5"-long, 39 watt, twin-tube CFL lamp, or an increase of 462% over the four-foot-long, 32-watt, T8-size, rapid start lamp described above. Additionally, the light emitted from multiple hairline light sources, when placed adjacent one another, simulates the light that would be emitted from one, larger, hairline light source. As such, the light from the multiple sources is easier to direct and control by conventional reflectors or lenses that are designed for hairline light sources. Commonly used reflectors provide either elliptical or parabolic arcs, or both. For example, a reflector with both elliptical and parabolic arcs is sold by Elliptipar, Inc., of West Haven, Conn., under the trademark ELLIPTIPAR®.

Therefore, it would be desirable to provide an arrangement for orienting multiple elongated lamps in a lighting fixture that allows the placement of the multiple lamps closer together than would normally be allowed by the size of the lampholders.

It would also be desirable to provide an arrangement for orienting multiple elongated lamps in a lighting fixture that allows the placement of the multiple lamps such that they simulate, as closely as possible, a hairline source of light.

SUMMARY OF THE INVENTION

It is an object of this invention to provide an arrangement for orienting multiple elongated lamps in a lighting fixture that allows the placement of the multiple lamps closer together than would normally be allowed by the size of the lampholders.

It is also an object of this invention to provide an arrangement for orienting multiple elongated lamps in a lighting fixture that allows the placement of the multiple lamps such that they are tightly gathered to simulate a hairline source of light, and in particular a hairline source of light centered on the focus or optical center of the reflector.

In accordance with this invention, there is provided a lighting fixture for producing enhanced lamp light output density. The fixture includes a reflector having two ends, a fixture optical centerline extending between the ends, and a fixture length along the fixture optical centerline. At least one lampholder is mounted substantially adjacent each of the ends of the reflector, each lampholder being mounted at its respective location such that a projection of each lampholder along the fixture optical centerline toward the other lampholder partially overlaps the other lampholder. Each lampholder has a lampholder length. The fixture further includes at least two elongated lamps, each lamp having a plug portion for mating with one of the lampholders, the plug portion having a plug portion length, a distal portion opposite the plug portion, a lamp longitudinal axis running from the plug portion to the distal portion, and a lamp length along the lamp longitudinal axis from the plug portion to the distal portion. Each of the lamps is mounted in one of the lampholders such that the lamp longitudinal axes of the lamps are substantially parallel to the optical centerline and are offset from one another. A portion of the plug portion remains exposed when the lamp is mounted in the lampholder. The exposed portion has an exposed plug portion length. The fixture length is sufficiently greater than the sum of: (1) the lamp length of one of said lamps, (2) the exposed plug portion length of that one of the lamps, (3) the lampholder length of one of the lampholders associated with that one of the lamps, (4) the exposed plug portion length of the plug portion of another of the lamps, and (5) the lampholder length of the lampholder associated with the other of the lamps, that for adjacent lamps, being associated with lampholders mounted adjacent different ends of the reflector, the distal portion of any one of the lamps longitudinally clears the lampholder associated with, and the exposed plug portion of, any of the lamps adjacent that one of the lamps; and the lamps together form a lamp optical centerline substantially coincident with the fixture optical centerline.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
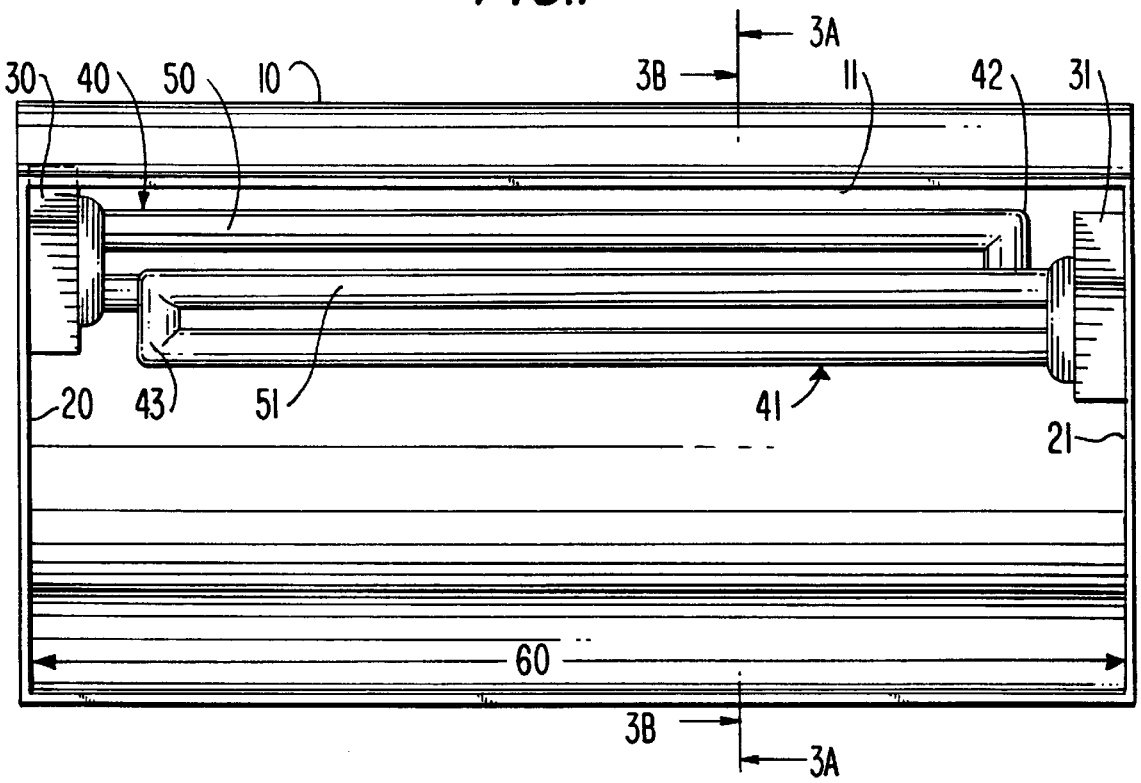
FIG. 1 is a front view of preferred embodiment of a lighting fixture according to the present invention containing two lamps.

The present invention provides an arrangement for lighting fixtures that produces a greater lamp light output density—i.e., more luminous flux (measured in lumens) from a smaller, more compact array of lamps—than could otherwise be obtained. This is achieved by mounting the lampholders for adjacent lamps on opposite sideplates of the lighting fixture and by increasing the inside dimension of the lighting fixture enough to accommodate the presence of lampholders at both ends. In this way, the lampholder for each lamp does not interfere with any portion of any adjacent lamp and the lampholders are no longer a limiting factor in how close the lamps can be to one another. The lamps can therefore be mounted close enough together so that they are tightly gathered and simulate a hairline source having an effective optical centerline substantially coincident with the optical centerline, or focus, of the reflector of the lighting fixture.

A preferred embodiment of a lighting fixture designed according to the present invention, with two compact fluorescent lamps, is illustrated in FIGS. 1–4B. Lighting fixture 10 includes a reflector 11 and sideplates 20 and 21. Reflector 11 preferably is the elliptical-parabolic reflector referred to above, which has a focus, or optical centerline, 22. One lampholder 30, illustrated in FIG. 4A as a standard 4-pin compact fluorescent lampholder, is mounted on sideplate 20. The other lampholder 31, illustrated in FIG. 4B as also being a standard 4-pin compact fluorescent lampholder, is mounted on sideplate 21. Lamp 40 is plugged into lampholder 30, while lamp 41 is plugged into lampholder 31. Lamps 40 and 41 are illustrated in FIGS. 1, 2, 3A and 3B as being twin-tube compact fluorescent lamps.

Figure 2:
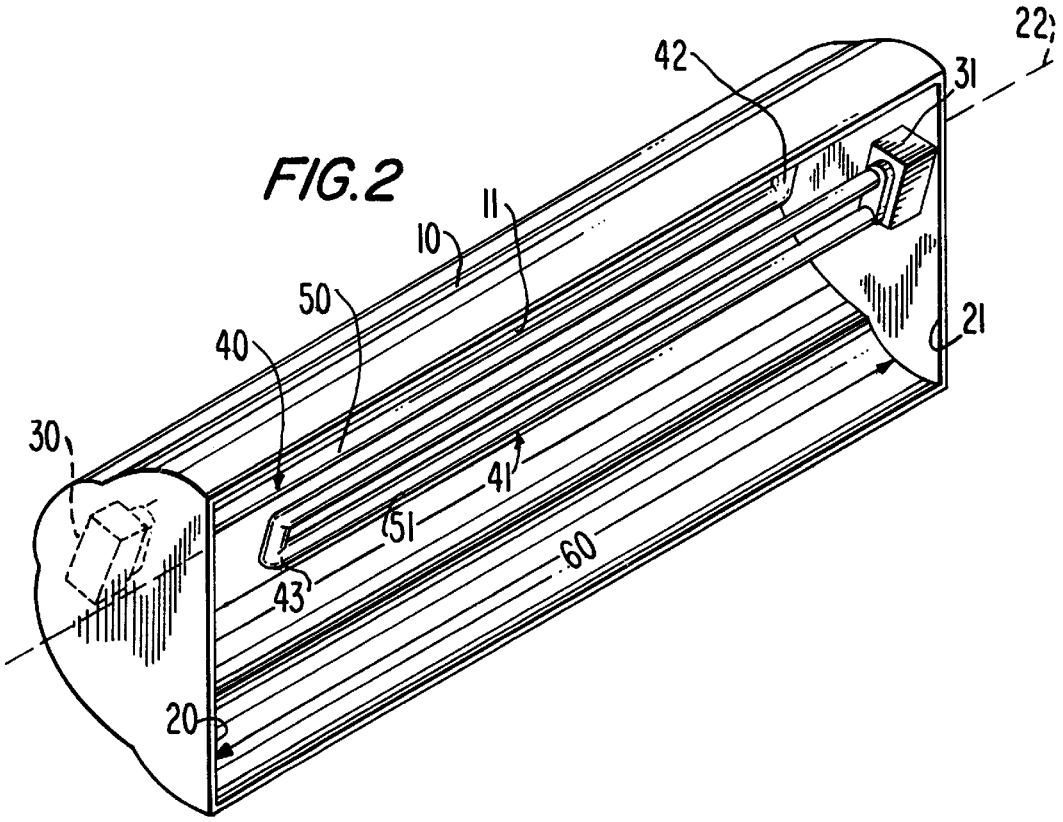
FIG. 2 is a perspective view of the lighting fixture of FIG. 1.

Sideplates 20, 21 are illustrated as preferably being full plates, e.g. in FIG. 2. However, this need not be the case. Sideplates 20, 21 may also preferably be cutaway (skeletal) plates, or brackets, or any other structure suitable for holding lampholders 30, 31 without occluding light, and therefore suitable for enabling continuous rows of luminaires to be made.

Figure 3A:
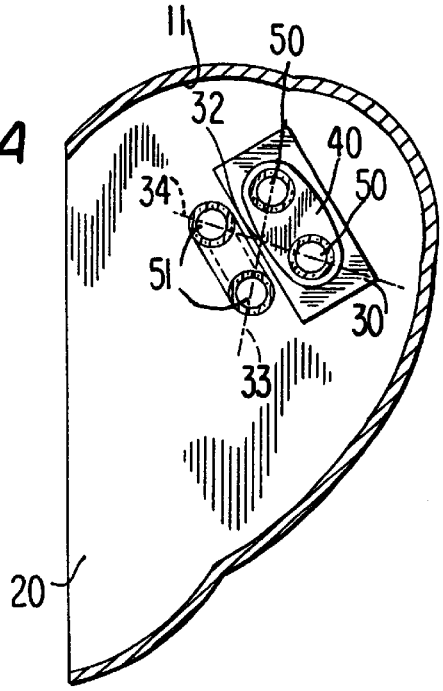
FIG. 3A is a cross-sectional view of the lighting fixture of FIG. 1, taken from line 3A—3A of FIG. 1.
Figure 3B:
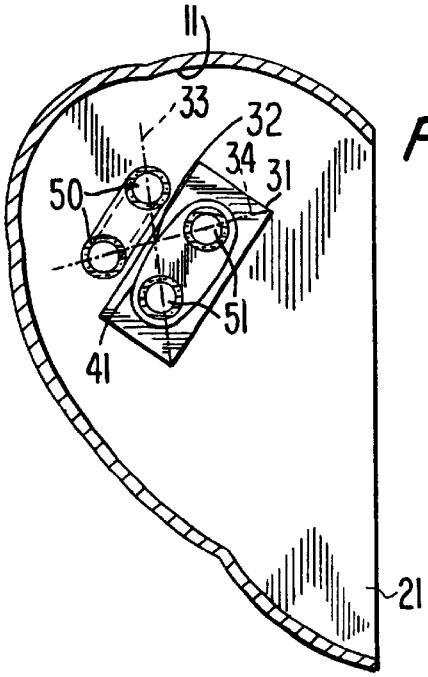
FIG. 3B is a cross-sectional view of the lighting fixture of FIG. 1, taken from line 3B—3B of FIG. 1.
Figure 4A:
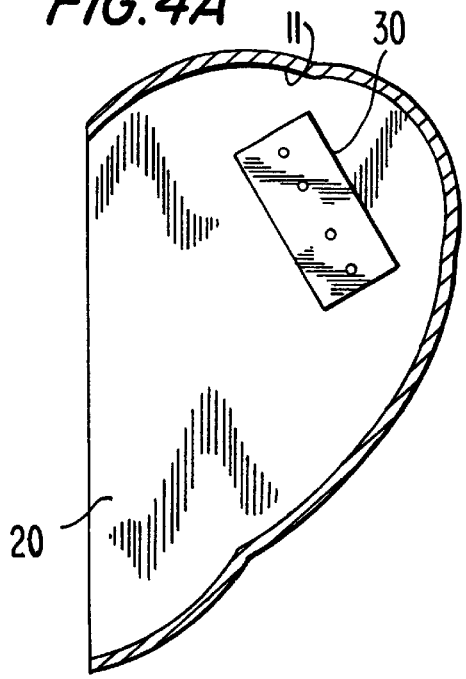
FIG. 4A is a cross-sectional view, similar to FIG. 3A, of the lighting fixture of FIG. 1 with the lamps removed.
Figure 4B:
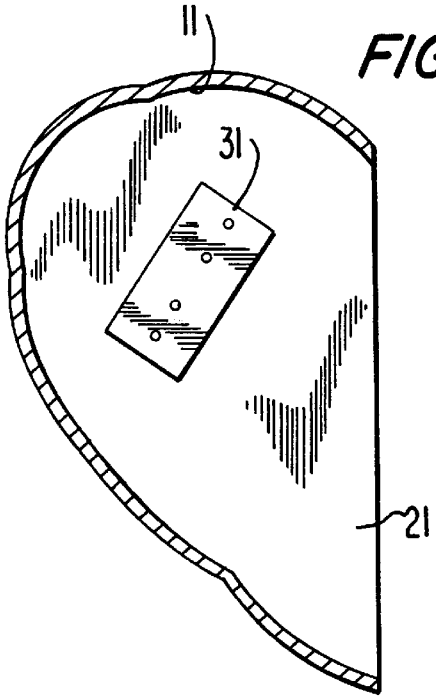
FIG. 4B is a cross-sectional view, similar to FIG. 3B, of the lighting fixture of FIG. 1 with the lamps removed.

As seen in FIGS. 2, 3A and 3B, the widths of lampholders 30, 31 are greater than the widths of lamps 40, 41. Therefore, if lampholders 30, 31 were both mounted on sideplate 20 or both mounted on sideplate 21, a substantial gap, approximately 100% to 120% of the diameter of the light-emitting tubes 50, 51 of lamps 40, 41, would necessarily exist between light-emitting tubes 50, 51. This arrangement is not conducive to maximum optical control.

In the embodiment illustrated in FIGS. 1–4B, however, optical control of lighting fixture 10 is enhanced through placement of the light-emitting tubes 50, 51 of lamps 40, 41 close together, in an arrangement approaching a hairline source having an optical centerline 32, indicated by the intersection of lines 33, 34 passing through the tube centers of tubes 50, 51. Lampholder 30 is mounted on sideplate 20, while lampholder 31 is mounted on sideplate 21. The lampholders are positioned so that a portion of the projection of lampholder 30 onto sideplate 21 overlaps a portion of lampholder 31. By mounting lampholders 30, 31 in this manner, the gap between lamps 40, 41 that would otherwise be necessitated by mounting lampholders 30, 31 on the same sideplate may be partially or completely eliminated, as desired. As shown, optical centerline 32 of the effective hairline source formed by tightly gathered lamps 40, 41 substantially coincides with focus or optical centerline 22 of reflector 11, allowing maximum control by reflector 11 of the light output.

The inside dimension 60 of the lighting fixture 10 illustrated in FIGS. 1 and 2 along its longitudinal axis (the axis running from sideplate 20 to sideplate 21) is greater than essentially the combination of the lengths of either lampholder 30 and lamp 40 or lampholder 31 and lamp 41, which is essentially all that would have been required in a standard luminaire (plus room for installation/removal). Increased length 60 of the inside of lighting fixture 10 allows the distal end 42 of lamp 40 (the "U" portion connecting the two linear portions of the light-emitting tubes) to longitudinally clear the lampholder 31 and the plug portion of lamp 41. Similarly, the distal end 43 of lamp 41 longitudinally clears lampholder 30 and the plug portion of lamp 40. This feature allows the placement of the light-emitting tubes 50, 51 of lamps 40, 41 as close together as may be desirable.

In the preferred embodiment illustrated in FIGS. 1–4B, using standard 4-pin plug-in compact fluorescent lampholders and standard 4-pin plug-in lamps, the inside dimension 60 of the lighting fixture 10 is approximately 1.5" greater than either lamp/lampholder combination. The actual increase necessary in this dimension, however, is dependent on the particular lampholder and lamp being utilized. For lampholders that present a greater profile, a larger increase may be necessary. In any event, the increase in the inside dimension of the lighting fixture must be large enough to allow the distal end of each lamp to clear the plug portion and lampholder of the other lamp, so that the light-emitting tubes of two adjacent lamps could, if desired, be mounted in contact with each other, and to allow room for installation/removal.

In the preferred embodiment, the plane of one lamp, defined by the longitudinal axes of the lamp's two cylindrical legs, is parallel to the corresponding plane of the other lamp. The four tube-centers, in cross-section, form a square, or a nearly-square rectangle.

As seen in FIG. 1, in the preferred embodiment, lampholders 30, 31 have been mounted on sideplates 20, 21 such that the longitudinal axis of lamp 40 when mounted in lampholder 30 is elevated slightly relative to the longitudinal axis of lamp 41 when mounted in lampholder 31.

In the embodiment disclosed in FIGS. 1–4B, a small gap is provided between the lamps 40, 41. This gap serves several purposes. First, the gap between the adjacent lamps 40, 41 allows for relatively unencumbered emission of light, whether that light is direct radiation or reflected light. Rather than being forced to travel through the light-emitting tubes of the adjacent lamp before exiting the luminaire, a greater portion of the light emitted from an individual lamp will have a direct transmission route from the luminaire through this space. Second, this gap facilitates the circulation of cooling air. If the light-emitting tubes of adjacent lamps touched, a portion of the path otherwise travelled by circulating air would be eliminated. Finally, this gap provides for access by a screwdriver or other tool, for example for removal of screws securing the reflector, in situations where such access might not otherwise be available. The recommended gap between lamps 40, 41 is between about 20% and about 40% of the diameter of the light-emitting tubes 50, 51 of lamps 40, 41.

It should be apparent that any number of lampholders may be used in lighting fixtures designed according to the present invention, provided the lampholder for each individual lamp is mounted on a different sideplate (or bracket) from the lampholder for any lamps directly adjacent that individual lamp.

Thus it is seen that a lighting fixture for providing greater lamp light output density with better optical control is provided. One skilled in the art will appreciate that the present invention can be practiced by other than the described embodiments, which are presented for purposes of illustration and not of limitation, and the present invention is limited only by the claims which follow.

What is claimed is:

1. A lighting fixture for producing enhanced lamp light output density, said fixture comprising:

a reflector having a first end and a second end, a fixture optical centerline extending between said ends, and a fixture length along said fixture optical centerline;

at least a first lampholder and a second lampholder, said first lampholder mounted substantially adjacent said first end of said reflector and said second lampholder mounted substantially adjacent said second end of said reflector, each said lampholder being mounted at that lampholder's respective location such that a projection of said first lampholder along said fixture optical centerline toward said second lampholder partially overlaps said second lampholder, and such that a projection of said second lampholder along said fixture optical centerline toward said first lampholder partially overlaps said first lampholder, each said lampholder having a lampholder length;

at least two elongated lamps, each lamp having:

a plug portion for mating with one of said lampholders, said plug portion having a plug portion length, a distal portion opposite said plug portion, a lamp longitudinal axis running from said plug portion to said distal portion, and a lamp length along said lamp longitudinal axis from said plug portion to said distal portion; wherein each of said lamps is mounted in one of said lampholders such that said lamps are tightly gathered to simulate a hairline source, and the lamp longitudinal axes of said lamps are substantially parallel to the optical centerline and are offset from one another;

a portion of said plug portion remains exposed when said lamp is mounted in said lampholder, said exposed portion having an exposed plug portion length;

said fixture length is sufficiently greater than the sum of:

the lamp length of one of said lamps, the exposed plug portion length of said one of said lamps, the lampholder length of one of said lampholders associated with said one of said lamps, the exposed plug portion length of the plug portion of another of said lamps, and the lampholder length of the lampholder associated with said other of said lamps, that:

for adjacent lamps, being associated with lampholders mounted adjacent different ends of said reflector, the distal portion of any one of said lamps longitudinally clears the lampholder associated with, and the exposed plug portion of, any of said lamps adjacent said one of said lamps;

and said lamps together form a lamp optical centerline substantially coincident with said fixture optical centerline.

2. The lighting fixture of claim 1 wherein:

exactly one of said lampholders is mounted adjacent each said end of said reflector.

3. The lighting fixture of claim 1 wherein:

each of said lamps comprises at least one light-emitting tube having a tube diameter; and said at least one light-emitting tubes of adjacent ones of said lamps are spaced apart by between about 20% and about 40% of said tube diameter.

4. The lighting fixture of claim 3 wherein each of said lamps is a twin-tube lamp.

5. The lighting fixture of claim 4 wherein:

each tube of each of said twin-tube lamps has a longitudinal axis and a tube center through which said longitudinal axis passes;

the longitudinal axes of the two tubes of each respective one of said lamps define a respective plane; and said respective planes of said lamps are substantially parallel to one another.

6. The lighting fixture of claim 5, wherein:

exactly one lampholder is mounted adjacent each said end of said reflector, such that there are two said lamps and four said tubes; and the four tube centers, in cross-section, substantially form a rectangle.

7. The lighting fixture of claim 6, wherein said rectangle is substantially square.

8. A lighting fixture for producing enhanced lamp light output density, comprising:

a reflector and two substantially parallel sideplates defining a cavity having a light transmissive front, said reflector having a fixture optical centerline;

a respective standard 4-pin compact fluorescent lampholder mounted on each of the sideplates; and a respective twin-tube lamp mounted in each respective one of the lampholders; wherein:

there is a first said twin-tube lamp and a second said twin-tube lamp and four said tubes;

each tube of each of said twin-tube lamps has a tube center;

the two tubes of each of said respective twin-tube lamps define a respective lamp plane;

the length of the cavity is approximately 1.5" greater than substantially the combined length of one said twin-tube lamp and said respective lampholder associated with said one said twin-tube lamp;

the lamps, when mounted in the lampholders, are spaced approximately ⅛" to ¼" apart from each other;

the lamp plane of said first lamp is parallel to the lamp plane of said second lamp;

the four tube centers of said lamps, viewed along said longitudinal axes, substantially form a square; and the four tubes of said lamps together have a lamp optical centerline substantially coincident with said fixture optical centerline.

9. The lighting fixture of claim 1 further comprising a first sideplate at said first end of said reflector and a second sideplate at said second end of said reflector, said first lampholder being mounted on said first sideplate and said second lampholder being mounted on said second sideplate.

10. The lighting fixture of claim 9 wherein said sideplates are brackets suitable for holding said lampholders and which enable light from said lamps to radiate from said first and second ends of said reflector.

11. A lighting fixture for producing enhanced lamp light output density, for use with at least two elongated lamps, each lamp having:

a plug portion, said plug portion having a plug portion length, a distal portion opposite said plug portion, a lamp longitudinal axis running from said plug portion to said distal portion, and a lamp length along said lamp longitudinal axis from said plug portion to said distal portion; said fixture comprising:

a reflector having a first end and a second end, a fixture optical centerline entending between said ends, and a fixture length along said fixture optical centerline;

at least a first lampholder and a second lampholder, said first lampholder mounted substantially adjacent said first end of said reflector and said second lampholder mounted substantially adjacent said second end of said reflector, each said lampholder being mounted at that lampholder's respective location such that a projection of said first lampholder along said fixture optical centerline toward said second lampholder partially overlaps said second lampholder, and such that a projection of said second lampholder along said fixture optical centerline toward said first lampholder partially overlaps said first lampholder, each said lampholder having a lampholder length; wherein, when each of said lamps is mounted with said lamp's respective plug portion in one of said lampholders such that said lamps are tightly gathered to simulate a hairline source, and the lamp longitudinal axes of said lamps are substantially parallel to the optical centerline and are offset from one another:

a portion of said plug portion remains exposed, said exposed portion having an exposed plug portion length;

said fixture length is sufficiently greater than the sum of:

the lamp length of one of said lamps, the exposed plug portion length of said one of said lamps, the lampholder length of one of said lampholders associated with said one of said lamps, the exposed plug portion length of the plug portion of another of said lamps, and the lampholder length of the lampholder associated with said other of said lamps, that:

for adjacent lamps, being associated with lampholders mounted adjacent different ends of said reflector, the distal portion of any one of said lamps longitudinally clears the lampholder associated with, and the exposed plug portion of, any of said lamps adjacent said one of said lamps;

and said lamps together form a lamp optical centerline substantially coincident with said fixture optical centerline.

12. The lighting fixture of claim 11 wherein exactly one of said lampholders is mounted adjacent each said end.

*13. A lighting fixture for producing enhanced lamp light output density, said fixture comprising:*

*a reflector having two substantially parallel sideplates defining a cavity having a light transmissive front, said reflector having a fixture optical centerline extending between said sideplates, said cavity having a cavity length along said fixture optical centerline;*

*at least one respective lampholder mounted on each one of said sideplates, each said lampholder being mounted at its respective location such that a projection of one lampholder along said fixture optical centerline toward another said lampholder partially overlaps the other said lampholder, each said lampholder having a lampholder length;*

*at least two elongated lamps, each lamp having:*

*a plug portion for mating with one of said lampholders, said plug portion having a plug portion length,*

*a distal portion opposite said plug portion,*

*a lamp longitudinal axis running from said plug portion to said distal portion, and*

*a lamp length along said lamp longitudinal axis from said plug portion to said distal portion; wherein*

*each of said lamps is mounted in one of said lampholders such that said lamps are tightly gathered to simulate a hairline source, and the lamp longitudinal axes of said lamps are substantially parallel to the optical centerline and are offset from one another;*

*a portion of said plug portion remains exposed when said lamp is mounted in said lampholder, said exposed portion having an exposed plug portion length;*

*said cavity length is sufficiently greater than the sum of:*

*the lamp length of one of said lamps,*

*the exposed plug portion length of said one of said lamps,*

*the lampholder length of one of said lampholders associated with said one of said lamps,*

*the exposed plug portion length of the plug portion of another of said lamps, and*

*the lampholder length of the lampholder associated with said other of said lamps, that:*

*for adjacent lamps, being associated with lampholders mounted on different sideplates of said reflector, the distal portion of any one of said lamps longitudinally clears the lampholder associated with, and the exposed plug portion of, any of said lamps adjacent said one of said lamps; and*

*said lamps together form a lamp optical centerline substantially coincident with said fixture optical centerline.*

*14. The lighting fixture of claim 13 wherein said sideplates comprise brackets suitable for holding said lampholders without occluding light from said lamps.*

*15. The lighting fixture of claim 13 wherein said reflector has a first end and a second end, one of said sideplates being located at said first end and the other of said sideplates being located at said second end.*

*16. The lighting fixture of claim 13 wherein:*

*said reflector has at least three substantially parallel sideplates, at least one adjacent pair of said sideplates defining a cavity having a light transmissive front, said cavity having a cavity length along said fixture optical centerline;*

*each said lampholder is mounted at its respective location such that a projection of one lampholder along said fixture optical centerline toward another said lampholder mounted on an adjacent sideplate partially overlaps the other said lampholder; and*

*said cavity length is sufficiently greater than the sum of:*

*the lamp length of one of said lamps,*

*the exposed plug portion length of said one of said lamps,*

*the lampholder length of one of said lampholders associated with said one of said lamps,*

*the exposed plug portion length of the plug portion of another of said lamps, and*

*the lampholder length of the lampholder associated with said other of said lamps, that:*

*for adjacent lamps, being associated with lampholders mounted on adjacent sideplates of said reflector, the distal portion of any one of said lamps longitudinally clears the lampholder associated with, and the exposed plug portion of, any of said lamps adjacent said one of said lamps; and*

*said lamps together form a lamp optical centerline substantially coincident with said fixture optical centerline.*

*17. The lighting fixture of claim 13 wherein:*

*exactly one of said lampholders is mounted on each one of said sideplates.*

*18. The lighting fixture of claim 13 wherein:*

*each of said lamps comprises at least one light-emitting tube having a tube diameter; and*

*said at least one light-emitting tubes of adjacent ones of said lamps are spaced apart by between about 20% and about 40% of said tube diameter.*

*19. The lighting fixture of claim 18 wherein each of said lamps is a twin-tube lamp.*

*20. The lighting fixture of claim 19 wherein:*

*each tube of each of said twin-tube lamps has a longitudinal axis and a tube center through which said longitudinal axis passes;*

*the longitudinal axes of the two tubes of each respective one of said lamps define a respective plane; and*

*said respective planes of said lamps are substantially parallel to one another.*

*21. The lighting fixture of claim 20 wherein:*

*exactly one lampholder is mounted on each one of said sideplates, such that there are two said lamps and four said tubes; and*

*the four tube centers, in cross-section, substantially form a rectangle.*

*22. The lighting fixture of claim 21 wherein said rectangle is substantially square.*

*23. A lighting fixture for producing enhanced lamp light output density, for use with at least two elongated lamps, each lamp having:*

*a plug portion, said plug portion having a plug portion length,*

*a distal portion opposite said plug portion,*

*a lamp longitudinal axis running from said plug portion to said distal portion, and*

*a lamp length along said lamp longitudinal axis from said plug portion to said distal portion; said fixture comprising:*

*a reflector having a first sideplate and a second sideplate, said sideplates defining a cavity, said reflector having a fixture optical centerline extending between said sideplates, said cavity having a cavity length along said fixture optical centerline;*

*at least a first lampholder and a second lampholder, said first lampholder mounted on said first sideplate and said second lampholder mounted on said second sideplate, each said lampholder being mounted at that lampholder's respective location such that a projection of said first lampholder along said fixture optical centerline toward said second lampholder partially overlaps said second lampholder, and such that a projection of said second lampholder along said fixture optical centerline toward said first lampholder partially overlaps said first lampholder, each said lampholder having a lampholder length; wherein, when each of said lamps is mounted with said lamp's respective plug portion in one of said lampholders such that said lamps are tightly gathered to simulate a hairline source, and the lamp longitudinal axes of said lamps are substantially parallel to the optical centerline and are offset from one another:*

*a portion of said plug portion remains exposed, said exposed portion having an exposed plug portion length;*

*said cavity length is sufficiently greater than the sum of:*

*the lamp length of one of said lamps,*

*the exposed plug portion length of said one of said lamps,*

*the lampholder length of one of said lampholders associated with said one of said lamps,*

*the exposed plug portion length of the plug portion of another of said lamps, and*

*the lampholder length of the lampholder associated with said other of said lamps, that:*

*for adjacent lamps, being associated with lampholders mounted on different sideplates of said reflector, the distal portion of any one of said lamps longitudinally clears the lampholder associated with, and the exposed plug portion of, any of said lamps adjacent said one of said lamps; and*

*said lamps together form a lamp optical centerline substantially coincident with said fixture optical centerline.*

* * * * *

UNITED STATES PATENT AND TRADEMARK OFFICE

CERTIFICATE OF CORRECTION

PATENT NO. : RE 37, 310 E
DATED : August 7, 2001
INVENTOR(S) : Sylvan R. Shemitz It is certified that error appears in the above-identified patent and that said Letters Patent is hereby corrected as shown below:

Column 1,
Line 31, change "32 -watt" to -- 32-watt --;

Column 7,
Line 41, change "entending" to -- extending --.

Signed and Sealed this

Thirtieth Day of April, 2002

*Attest:*

*Attesting Officer*

JAMES E. ROGAN
*Director of the United States Patent and Trademark Office*